(No Model.)

O. F. DUBOIS.
MEASURING VESSEL.

No. 509,210. Patented Nov. 21, 1893.

WITNESSES
Jesse Heller.
Philip C. Masi.

INVENTOR
O. F. Dubois
by E. W. Anderson.
his Attorney

UNITED STATES PATENT OFFICE.

OLIVIER F. DUBOIS, OF TURTLE LAKE, WISCONSIN.

MEASURING-VESSEL.

SPECIFICATION forming part of Letters Patent No. 509,210, dated November 21, 1893.

Application filed March 9, 1893. Serial No. 465,302. (No model.)

*To all whom it may concern:*

Be it known that I, OLIVIER F. DUBOIS, a citizen of the United States, and a resident of Turtle Lake, in the county of Barron and State of Wisconsin, have invented certain new and useful Improvements in Devices for Measuring Flour; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
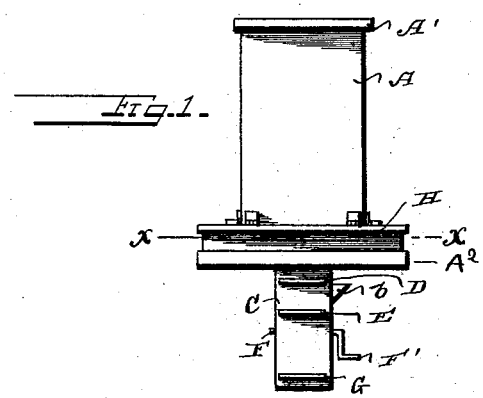
Figure 2:
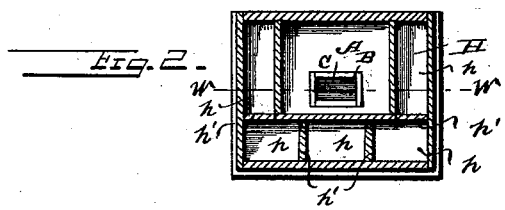
Figure 3:
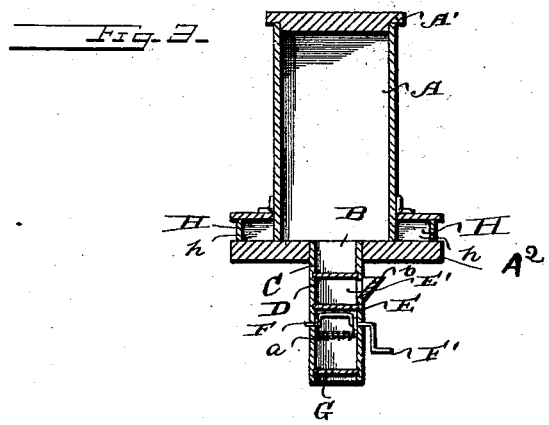

Figure 1 of the drawings is a front view of the device. Fig. 2 is a horizontal section on line $x\ x$ Fig. 1 and Fig. 3 is a vertical longitucinal section on line $w\ w$ Fig. 2.

This invention has relation to certain new and useful improvements in kitchen articles, the object being to provide a combined flour receptacle, measure, mixer, and cabinet, which will be of simple construction, and which will form a useful and convenient article for kitchen use; and the invention consists in the novel construction and combination of parts, all as hereinafter described and pointed out in the appended claim.

Referring to the accompanying drawings illustrating the invention, the letter A represents the flour receptacle, supported upon a bottom board $A^2$, and which is shown as consisting of a box or bin of rectangular form, although said box may be of circular or other form. This box may be of any suitable size, one with a capacity of from fifty to one hundred pounds being very convenient. The upper end of the box is fitted with a removable cover A'. Formed in the bottom of this box is an opening B, which leads into a vertical chute or tube C, attached to the under side of the box, and of smaller cross-section. The opening B is normally closed by a slide D, the outer end of which projects through the chute or tube in position to be grasped by the hand. Below the slide D is a second slide E, which is located at such a point that the portion E' of the tube or chute between the two slides shall when filled, contain a definite quantity, such as one or more quarts by measure, or one or more pounds by weight. Below the second slide E the tube or chute is provided with a sieve $a$, and above this sieve is journaled a sifter shaft F, one end of which projects through the tube or chute and is provided with a crank F'.

At the lower end of the tube or chute I usually provide a third slide G. Leading into the space or chamber E' between the slides D and E, is an opening or spout $b$, through which may be introduced soda, baking powder, salt, or other substance which it is desired to mix with the flour.

The operation is as follows:—When it is desired to procure flour for use in definite quantities, the upper slide D is opened, allowing the chamber E' to fill, after which said slide is again closed. The salt, baking powder, or other substance desired is introduced through the opening or spout $b$, the slide E opened, and the sifter shaft then operated, which not only thoroughly mixes the baking powder or other substance with the flour, but also sifts the flour, which falls through the lower slide into the pan or dish in which it is to be used. The operation may be repeated until the desired quantity of the flour is obtained.

H designates the cabinet, which is secured to the box A, upon three sides thereof, and projecting horizontally therefrom. Said cabinet consists of a series of apartments $h$, separated from each other by partitions $h'$, and designed to contain such articles as salt, soda, baking powder, spices, knives, forks, spoons, &c. Said apartments are closed by hinged covers K. The device is designed to be attached to a wall, or to sit upon a stand or table.

Having described this invention, what I claim, and desire to secure by Letters Patent, is—

The herein described kitchen article, comprising a bottom board $A^2$ adapted to fit against a wall at its rear edge, a box or bin A supported upon said board, the removable cover A' for said box or bin, the opening B through said board $A^2$, the vertical chute or tube C secured at its upper portion in said opening, the slide D arranged to normally close said opening, the slide E below the slide D, and forming therewith an apartment E' of a given capacity, a sieve $a$ below said slide E, a sifter shaft F arranged to operate against said sieve, a small spout $b$ leading into said chamber E', and a series of shallow compartments $h$, supported on said board $A^2$ upon three sides of the box or bin A, said apartments being provided with hinged covers, substantially as specified.

In testimony whereof I affix my signature in presence of two witnesses.

OLIVIER F. DUBOIS.

Witnesses:
L. M. RICHARDSON,
AUG. BÉLANGER.